Patented Sept. 15, 1931

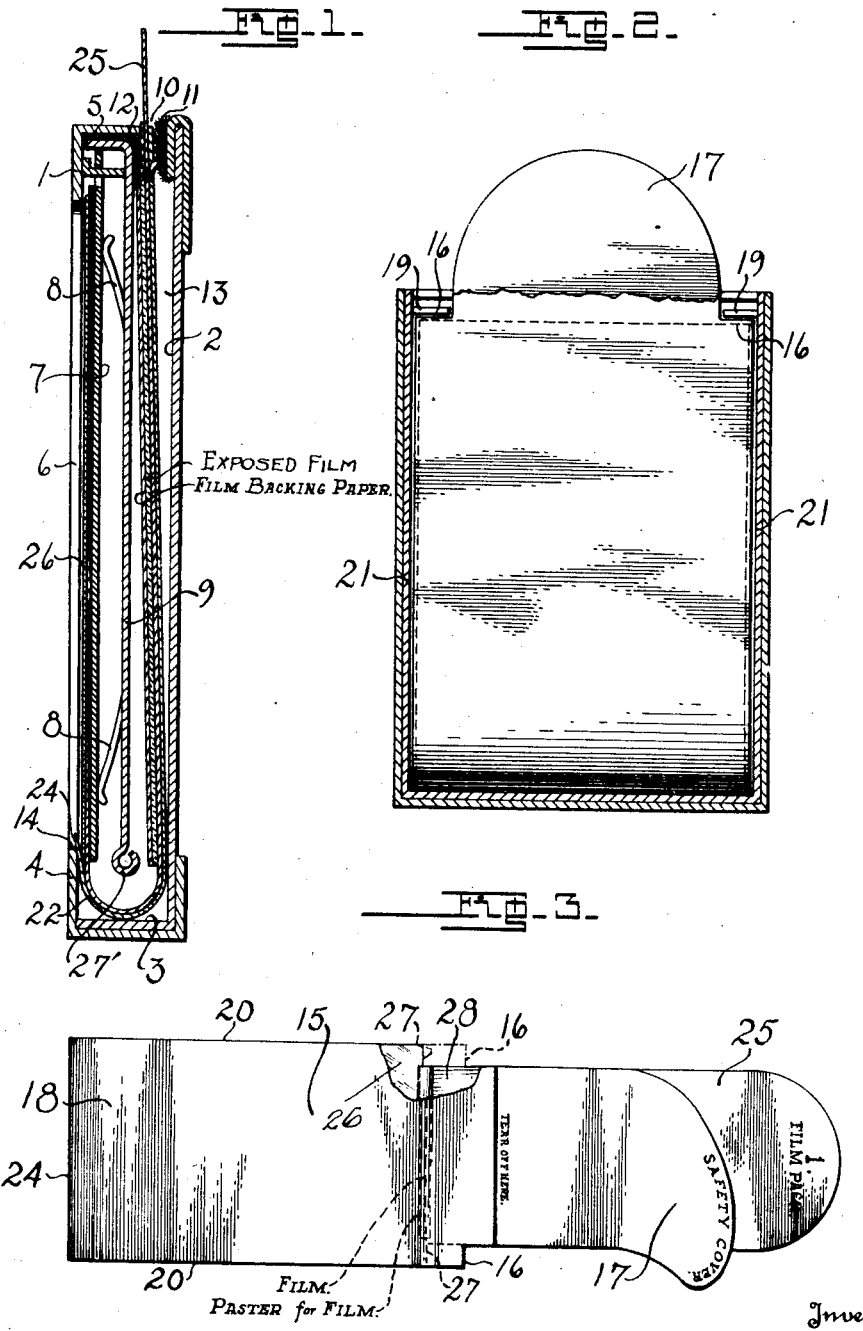

1,823,295

UNITED STATES PATENT OFFICE

HOWARD A. SAUER, OF ROCHESTER, NEW YORK, ASSIGNOR TO EASTMAN KODAK COMPANY, OF ROCHESTER, NEW YORK, A CORPORATION OF NEW YORK

FILM PACK CONSTRUCTION

Application filed November 18, 1929. Serial No. 407,799.

This invention relates to photography and more particularly to photographic film packs. One object of my invention is to provide a film pack with a means to prevent scratching or marring of the films as they are drawn from an exposure chamber into an exposed film chamber. Another object of my invention is to provide a safety cover and film pack liner which may be inserted into the casing with the film and which may be used in film packs of well known construction. Other objects will appear from the following specification, the novel features being particularly pointed out in the claims at the end thereof.

Coming now to the drawings wherein like reference characters denote like parts throughout:

Fig. 1 is a section through a film pack equipped with a combined safety cover and lining constructed in accordance with and illustrating a preferred embodiment of my invention.

Fig. 2 is a section through a film pack similar to that shown in Fig. 1 but taken at substantially 90° to the section shown in Fig. 1.

Fig. 3 is a plan view of a safety cover and films before being inserted into the film pack.

The casing of the film pack may be of any well known construction although my invention is particularly adapted for use with the film pack shown in Patent No. 1,219,588, Ruttan et al., March 20, 1917.

The pack may consist of a casing 1 having outer walls 2, 3, 4 and 5. Wall 4 is provided with an exposure frame or opening 6 behind which a presser plate 7 may be mounted, this plate being normally thrust forwardly by means of springs 8, struck out from a partition member 9. Wall 5 is provided with an opening 10 having light trapping material 11 and 12 on both sides of the opening, this opening permitting the manipulation of the films and of the safety cover in the usual manner. So far the film pack may be of any well known construction.

It frequently happens that, where a film pack casing is made of stiff cardboard, and particularly where it is made of thin sheet metal, there are rough surfaces on parts of the outside walls of the casing against which the sensitive surfaces of the films may contact as they are drawn from the exposure frame 6 into the exposed film compartment 13 of the film pack. In cardboard casings, sharp edges may sometimes mar or scratch a film. In thin sheet metal casings, the punched out edges, such as the edge 14 of the exposure frame 6, may be rough, due to worn tools or there may be small particles of dirt or hard lacquer on the outside walls 3, 4 or 2 of the casing, so that these minute particles may, under adverse conditions, seriously scratch the sensitive emulsion of a film being drawn against them.

The usual film pack is provided with an opaque paper covering which lies over the exposure opening 6 when the film pack is assembled, and before taking any pictures. After the pack is in the camera, this paper must be withdrawn by a tab in order to expose the first film.

My invention is largely directed to the modification of this black paper in such a manner that it will not only serve as a cover for the opening 6, but it will also provide a smooth flexible lining member for the inside walls of the film pack casing when the tab has been drawn out to expose the first film.

In Fig. 3, I have shown a plan view of a protective paper covering 15 which I will call a safety cover. This cover is provided with a pair of shoulders 16 and elongated tab 17 and a wide flat portion 18, which, when the film pack is first assembled, is adapted to cover the opening 6. When, however, the tab 17 is drawn out to expose the first film, the shoulders 16 are adapted to come into engagement with the abutments 19 on the film pack casing and to form a stop which will limit the outward movement of the tab. The size and shape of the flat portion 18 is such, as shown in Fig. 2, that the edges 20 lie close to the film pack casing and the extreme end 22 of part 18 will extend around the bottom wall 3, the edge 24 projecting slightly over the lower edge 14 of the exposure frame 6. Thus it will be seen that the entire bottom of rear walls of the film pack casing are lined by the safety cover after the tab has been drawn out and the lower portion of the front wall 4 has also been lined by this paper member. A smooth curved guideway is formed by the paper round the bottom wall of the film pack, so that when tabs 25 are pulled out to move films 26 about the end 27' of the partition 9, the sensitive surface of the films 26 will rest solely upon the smooth flexible paper member 18, and, by preventing contact with the outer walls of the film pack casing, will eliminate scratching or otherwise marring the film.

As is indicated in Fig. 3, the shoulders 16 of the safety cover 15 are higher (that is, closer to the end of the tab 17) than are the shoulders 27 of the film papers 28, which terminate in tabs 25 which lie directly beneath and they are partially concealed by the tab 17. These shoulders 16, therefore, stop the movement of the safety cover sooner than the movement of the films is stopped so that the end 22 of the safety cover is not drawn around into chamber 13, as is the case with the films.

For the sake of clearness in the drawings, I have only shown a single film with its backing paper and a single tab extending from the film pack casing. It is customary, however, to pack 12 films at a time in one of these casings, and, where such is the case, the compartments of the film pack are more nearly filled with films and because of the restricted space through which these films are drawn from an exposure position into the exposed film chamber 13, scratching is much more liable to occur than might appear from Fig. 1.

I am aware that it has been proposed before to place small cardboard linings in the bottom of a film pack to prevent scratching. Such linings improve the condition of the pack, but they form a separate part which makes it difficult to assemble the pack and the part may become easily displaced, unless additional operations are performed to definitely hold it in place. Even when this is done, there is frequently a gap between the end of the liner and the end of the usual type of protective covering, so that, by providing a continuous smooth liner for the back, bottom and part of the front walls of the film pack, I have provided a structure which overcomes these difficulties.

It should also be noted that the safety cover constructed in accordance with my invention can be very easily placed into film packs of well known construction, as it may be loaded with the films into the pack in the usual manner without any changes whatever in the assembling operation.

I prefer to form my safety cover of thin very smooth paper similar to the paper now used for the tabs which are attached to the films. This paper is particularly suitable because of the smoothly finished surface which offers a minimum resistance to the film and provides a surface on which dust is not likely to stick.

Having thus described my invention, what I claim as new and desire to secure by Letters Patent is:

1. In a photographic film pack, the combination with a casing having an exposure frame and a partition therein having an end spaced from the casing, a plurality of films mounted in the casing, tabs on the films extending through the casing and around the partition, a safety cover longer than said films and having a tab extending through the casing and around the partition and cooperating positioning means on the tab and casing for locating the safety cover between the films and the casing with a portion thereof extending around the end of said partition producing a flexible, smooth lining in the casing.

2. In a photographic film pack, the combination with a casing having an exposure frame and a partition therein having an end spaced from the casing, a plurality of films mounted in the casing, tabs on the films extending through the casing and around the end of the partition, a single paper member in the casing adapted to cover the exposure frame and extend beyond said frame when in one position, and adapted to lie around the end of the partition and to line the film pack casing when moved from the first mentioned position, and a tab moving the paper member.

3. In a photographic film pack, the combination with a casing having an exposure frame and a partition, said partition being located between outer walls of the casing, and having an end spaced from the casing a plurality of films and a safety cover on the films and safety cover extending around said partition and through an outer wall of said casing forming tabs by which the films and safety cover may be moved about the partition, said safety cover being adapted to line the outer wall of the film pack casing around the end of the partition which is spaced from the casing when the tab is pulled out.

4. In a photographic film pack, the combination with a casing having an exposure frame and a partition therein, of a plurality of films, a plurality of backing papers to which the films are attached, a safety cover, tabs on the backing papers and safety cover, shoulders on the backing papers and safety cover, the length of the safety cover to the shoulders being greater than the length of the films whereby a portion of the safety cover may remain adjacent and an edge of the exposure frame when the shoulders of the film backing papers and safety cover are parallel.

5. In a photographic film pack, the combination with a casing having an exposure frame and a partition therein spaced from the casing at one end, of a plurality of films, a plurality of backing papers to which the films are attached, a safety cover longer than said films, tabs on the backing papers and safety cover, shoulders on the backing papers and safety cover, stops located in the film pack against which the shoulders may be drawn by the tabs, the length of the safety cover from the tab to the shoulder being less than the length of the backing papers from the tabs to the shoulders, whereby the end of the safety cover may form a slideway protecting the films from scratching on the casing around that end of the partition which is spaced from the casing.

6. In a photographic film pack, the combination with a casing having an exposure frame including a lower edge and a partition therein spaced from the end of the casing, of a plurality of films, a plurality of backing papers to which the films are attached, a safety cover longer than said films, tabs on the backing papers and safety cover, shoulders on the backing papers and safety cover, stops located in the film pack against which the shoulders may be drawn by the tabs, the safety cover being of such length that when the shoulders contact with the stops, the end of the safety cover will lie against the lower edge of the exposure frame.

7. In a photographic film pack, the combination with a casing having an exposure frame having a lower edge, a partition spaced from the casing near the lower edge of the exposure frame, and stops therein, of a safety cover adapted to normally cover the exposure frame being longer than said frame and having a tab for moving the cover, shoulders on the safety cover to limit the movement of the cover relative to the casing, said cover being substantially as wide as the casing and of a length sufficient to contact with the lower edge of the exposure frame when the shoulders rest against the stops.

Signed at Rochester, New York this 12th day of November 1929.

HOWARD A. SAUER.